Jan. 20, 1953 A. G. DEAN 2,625,890
ROOF CONSTRUCTION FOR PASSENGER-TYPE RAILWAY CARS
Filed April 13, 1949
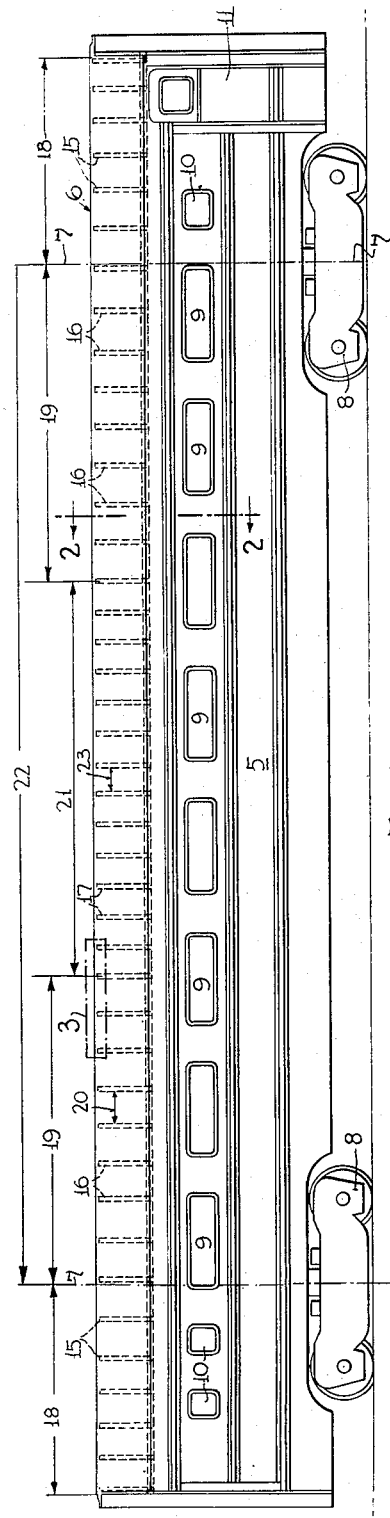
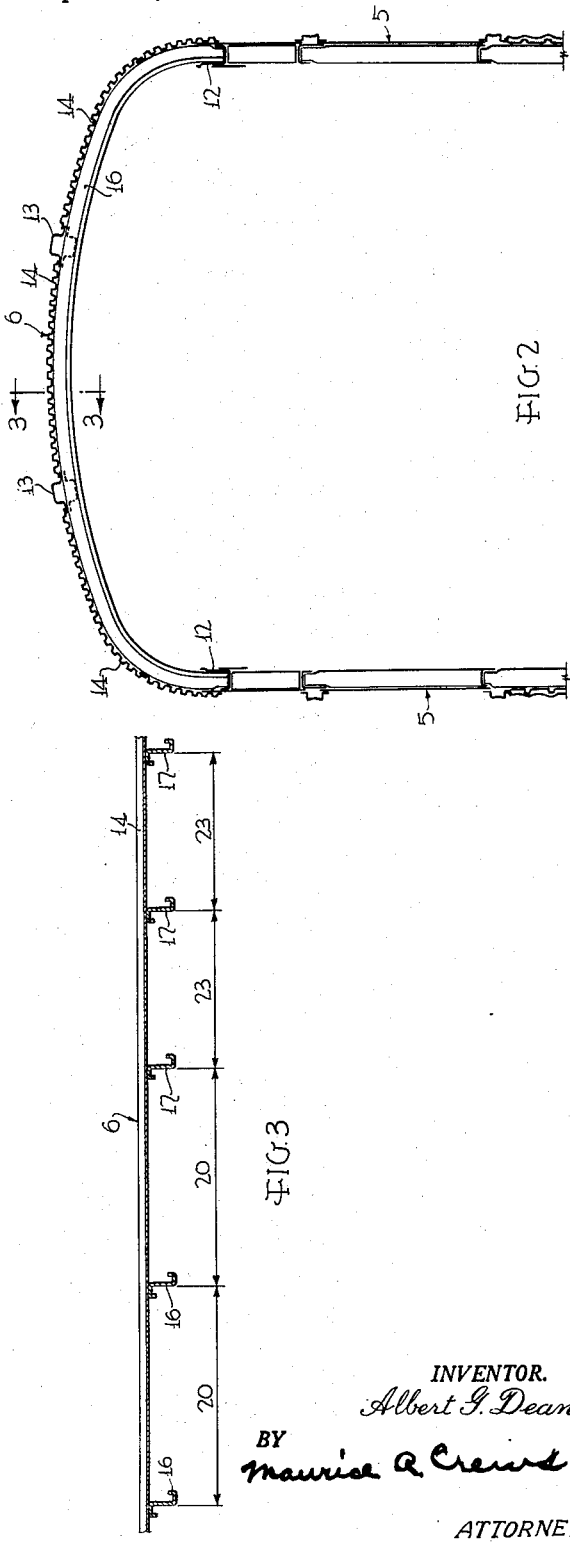
INVENTOR.
Albert G. Dean
BY Maurice A. Crews
ATTORNEY Patented Jan. 20, 1953

2,625,890

UNITED STATES PATENT OFFICE 2,625,890

ROOF CONSTRUCTION FOR PASSENGER-TYPE RAILWAY CARS

Albert G. Dean, Narberth, Pa., assignor to The Budd Company, Philadelphia, Pa., a corporation of Pennsylvania Application April 13, 1949, Serial No. 87,144

8 Claims. (Cl. 105—401)

The invention relates to passenger railway cars made of sheet metal, having the entrance doors arranged at or near the car ends and having a thin-gauge roof sheathing secured to longitudinally spaced carlines. Cars of this specific construction present, sometimes, a perplexing problem in that the roof sheathing develops transverse waves or buckles which mar the appearance and possibly affect the strength of the car.

Different means and procedures for solving the problem, that is for avoiding the waviness of the roof sheathing, have been suggested and some of them actually used. The known means and procedures, however, require expensive additional manufacturing steps and installations, they call for great care in their application, and they can be used only for cars having heavy longitudinal structures of great compression strength.

The object of the invention is a solution of the problem which is free of the objectionable features of the previous procedures and means, which does not require more than ordinary care in manufacturing and assembling the car body, which calls for practically no expensive additional manufacturing steps and equipment, and which is applicable to constructions having no longitudinal members of great compression strength. The invention does involve an increase of the number of parts entering into the construction and an increase in weight, both of which, however, are insignificantly small as compared with the total weight of the car.

The invention solves the problem and achieves its objects in a very simple way. In an ordinary railway car for passenger trains, the body of which is free of strength reducing features such as side entrance or loading openings between the truck supports, the carlines are equally spaced from each other between the truck supported end regions, the spacing being determined by the strength requirements. In the new construction, the same spacing of the carlines, as dictated by the strength requirements, is maintained in the regions adjoining in inboard direction the truck supported end regions, but in the mid region of the car the spacing between the carlines is diminished, that is the number of carlines is somewhat increased. An appropriate shortening of the distance between the carlines in the mid region was found to solve the problem.

It should be understood that differential spacings of the carlines are known for such types of cars presenting special strength requirements in different regions of their length; such situations are found, for instance, in baggage or other cars having large door openings in the mid region of the side walls so that the stresses have to be directed in part over the top of the openings into the roof and the roof has to be strengthened by additional carlines. The invention, however, employs the differential spacing of the carlines in a car construction where carlines always had been equally spaced because the side walls were of uniform construction over the entire region between the truck supported ends.

A more complete understanding of the invention will be gained from the embodiment illustrated in the attached drawing and described in the following.

In the drawing:

Figure 1 is a diagrammatic side elevation of a passenger railway car showing the arrangement of the door and window openings and, in dotted lines, the new arrangement of the carlines;

Figure 2 is a diagrammatic cross section through the roof and the adjoining portions of the side walls, the section being taken along line 2—2 of Figure 1; and Figure 3 is a fragmentary section on a larger scale along line 3—3 of Figure 2 and extending over the longitudinal region surrounded by the dot-and-dash line 3 of Figure 1.

The illustrated car body presenting the customary closed box sectional beam formed by the underframe (not shown), the side walls 5 and the roof 6, is supported at 7 by trucks 8. The side walls 5, representing load supporting girders, may be of any known or otherwise appropriate design, e. g., they may comprise posts, chords and outer sheathing. About equally spaced, large window openings 9 are formed in the region of the side walls between the truck supports 7 while the end regions may be provided with smaller window openings 10 and door openings 11. Note that the window openings 9 affect the supporting strength of the body to the same degree over the entire space between the supporting axes or zones 7.

The roof 6 comprises marginal chord structures 12 adjoining the upper margins of the side walls 5, longitudinal purlines 13, longitudinally corrugated roof sheathing 14 and transversely extending longitudinally spaced carlines 15, 16 and 17. The carlines are secured throughout their length to the sheathing or skin 14 and the longitudinal frame members 12, 13 as by spot welding.

The carlines 15 in the end regions 18 are spaced from each other, as customary, in accordance with the specific strength and other requirements to be met at and outboard of the truck supports 7. The carlines 16 in each region 19 of the car adjoining a truck support 7 in inboard direction, are equally spaced from each other and from the adjoining end and central carlines 15, 17 by distances 20 as customary for the specific type of car and as compatible with the required strength.

The carlines 17 in central region 21, extending over about one third of the length 22 between the supports 7, are spaced from each other by distances 23 which are much shorter than the distances 20 of the carlines 16 in the adjoining regions 19, the ratio of the spacing 20 between the carlines 16 to the spacing 23 between the carlines 17 may be about 4:3.

In the illustrated car construction having an overall length of about 85′ and a length 22 of about 69′ 6″, the carlines 16 in the regions 19 may have the customary spacing 20 of about 27½″. In the same car, the spacing 23 between the carlines 17 in the central region 21 may be about 21″. The aim of the invention is, therefore, achieved by simply adding three further carlines to the customary number of carlines and by more closely spacing the carlines in the longitudinal mid region 21.

The invention is not restricted to the illustrated embodiment but may be adapted to specific car constructions and otherwise modified.

While, for instance, it is considered advantageous to use the same type of carlines throughout, that is carlines of the same cross sectional dimensions and extending over the full width of the body, the object of the invention can be achieved also by interposing lighter and/or shorter carlines between the ordinary carlines in region 21. Instead of equally spacing the carlines within the regions 19 and 21, the spacing might be gradually decreased toward the center.

Another example of a possible modification is the use of the differential spacing of the carlines in accordance with the invention in combination with pre-tensioning of the roof skin to a degree which is compatible with the strength of the longitudinal frame members but which in itself would not effectively prevent waviness. This combination of the previously found remedy and of the new remedy permits a relatively wide spacing of the carlines even in the central area, and the use of relatively light purlines which would not be sufficiently strong to stretch the skin to a degree necessary for avoiding waviness without the closer spacing of the purlines.

What is claimed is:

1. In a body for railway cars of the passenger-train type, a roof and side walls forming main load supporting and stress transmitting elements, said side walls being free of strength reducing features such as side entrance openings between the wheel supported end regions of the body, said roof comprising longitudinally spaced transverse carlines and a thin-gauge sheet metal skin secured to the carlines, the spacing of the carlines in the regions adjoining in inboard direction the wheel supported regions being greater than in the longitudinal center region of the body so as to reduce the tendency of the roof skin to develop waves in said center region.

2. In a passenger-type railway car body, side walls having openings evenly distributed over the length between the supports of the body on the wheels, and a roof comprising longitudinally spaced carlines and a thin-gauge sheet metal sheathing secured to the carlines, the spacing of the carlines in the longitudinal mid region of the body being smaller than necessary for strength requirements thereby counteracting the tendency of the sheathing to form waves in said mid region, while the spacing of the carlines in the adjoining regions is as customary and as dictated by the strength requirements.

3. In a body for railway cars of the passenger-train type: wheel supports near the ends of the body; a roof and side walls forming main load supporting and stress transmitting elements; said side walls being free of strength reducing features, such as side entrance openings, which are restricted to a longitudinally short region between said wheel supports and which would require transfer of stresses from the side walls into the roof and a corresponding strength increase of the roof in such short region; said roof comprising longitudinally spaced transverse carlines and a thin-gauge sheet metal skin secured to the carlines, the carlines in the two regions adjoining in inboard direction the wheel supports and each extending over about one third of the distance between said supports having about equal spacing from each other, and the carlines in the central region extending about over the remaining one third of the length between the wheel supports having a smaller spacing for preventing the formation of waves in said roof skin in said central region.

4. In a passenger-type railway car body, side walls having openings evenly distributed over the length between the supports of the body on the wheels and a roof comprising longitudinally spaced carlines and a thin gauge sheet metal sheathing secured to the carlines, the spacing of the carlines in the longitudinal mid region of the body being in the order of one fourth smaller in said mid region than the spacing of the carlines in the adjoining regions.

5. In a body for railway cars of the passenger-train type, a roof and side walls forming main load supporting and stress transmitting elements, said side walls being free of strength reducing features such as side entrance openings between the wheel supported end zones of the body, said roof comprising longitudinally spaced transverse carlines and a thin-gauge sheet metal skin secured to the carlines, the carlines in the regions adjoining in inboard direction the wheel supported zones having about equal spacing from each other, and the carlines in the longitudinal center region of the body having likewise equal spacing from each other, said last-named spacing being so much smaller than said first-named spacing that the carlines in said center region overcome the tendency of the roof skin to develop waves.

6. In a body for railway cars of the passenger-train type, a roof and side walls forming main load supporting and stress transmitting elements, said side walls being free of strength reducing features such as side entrance openings between the wheel supports near the ends of the body, said roof comprising longitudinally spaced transverse carlines and a thin-gauge sheet metal skin secured to the carlines, the carlines having the same dimensions between said wheel supports but the spacing of the carlines in the regions adjoining in inboard direction the wheel supports being greater than in the longitudinal center region of the body, the smaller spacing of the carlines restraining the roof skin from developing waves when exposed to the sun.

7. In a body for railway cars of the passenger-train type, a roof and side walls forming main load supporting and stress transmitting elements, said side walls being free of strength reducing features such as side entrance openings between the wheel supports near the ends of the body, said roof comprising longitudinally spaced transverse carlines and a thin-gauge sheet metal skin secured to the carlines, the carlines having the same dimensions between said wheel supports but the spacing of the carlines in the regions adjoining in inboard direction the wheel supports being greater than in the longitudinal center region of the body, said roof skin being held at least in the longitudinal and transverse center region under tension by longitudinal compression resisting parts of the body, said tension and the smaller spacing of the carlines restraining the roof skin from developing waves when exposed to the sun.

8. In a body for railway cars of the passenger-car type, wheel supports near the ends of the body, a transversely arched roof and side walls forming main load supporting and stress transmitting elements, said side walls being free of local strength reducing features such as wide side door openings in the mid region of the body which extend over less than half the distance between said wheel supports, said roof extending with substantially uniform cross section over the length of the body, said roof comprising longitudinally spaced transverse carlines and a thin-gauge sheet metal skin secured to the carlines, the spacing of the carlines in said mid region being less than the spacing of the carlines in a region between said mid region and a wheel support.

ALBERT G. DEAN.

REFERENCES CITED

The following references are of record in the file of this patent:

UNITED STATES PATENTS

| Number | Name | Date |
|---|---|---|
| 2,244,390 | Dean | June 3, 1941 |
| 2,420,533 | Gilpin | May 17, 1947 |

FOREIGN PATENTS

| Number | Country | Date |
|---|---|---|
| 521,535 | France | Mar. 9, 1921 |